March 30, 1965 F. J. RUSSELL ETAL 3,175,439
FLANGE TRIMMING METHOD AND APPARATUS THEREFOR
Filed May 28, 1962 3 Sheets-Sheet 1
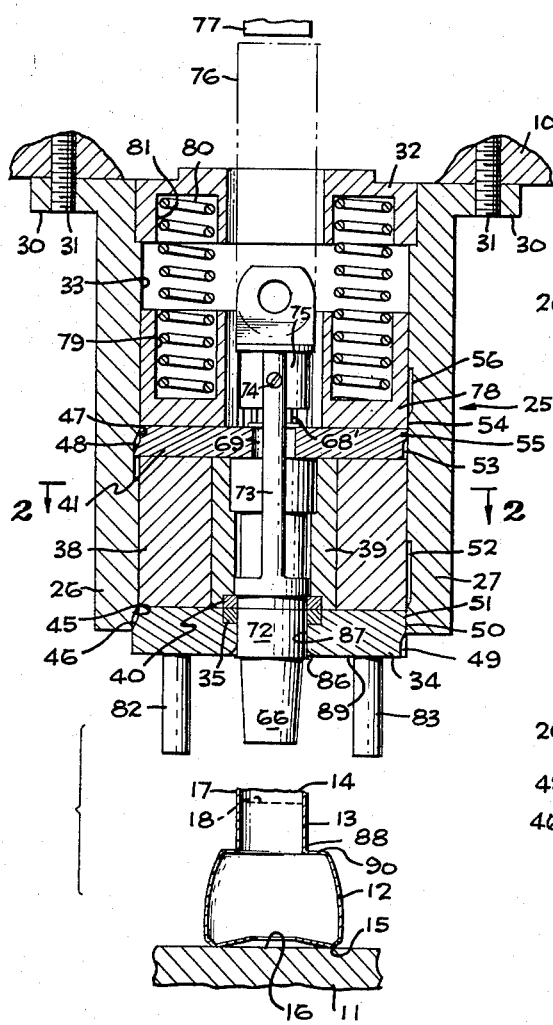
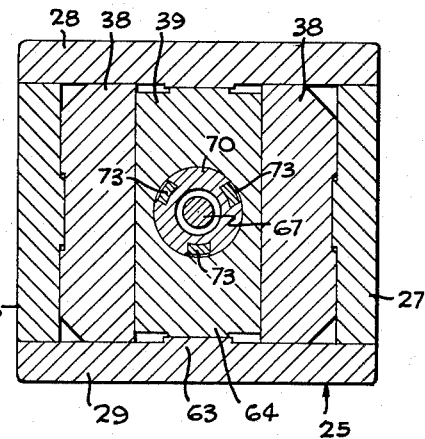
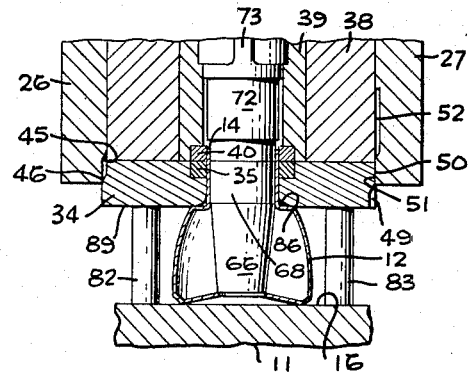
FRED J. RUSSELL
JOSEPH D. WITT
INVENTORS
BY
Beehler & Shanahan
ATTORNEYS

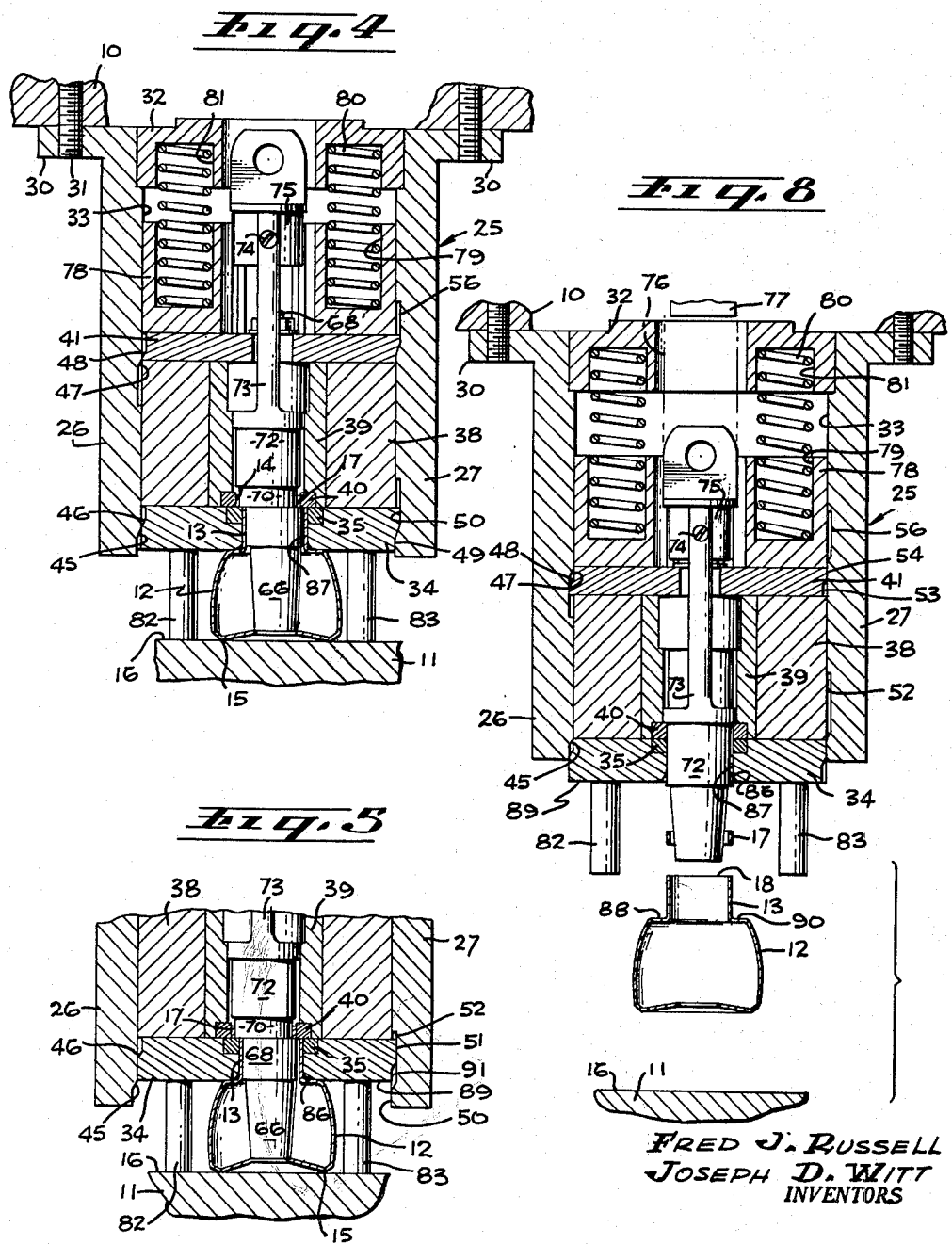

March 30, 1965 F. J. RUSSELL ETAL 3,175,439
FLANGE TRIMMING METHOD AND APPARATUS THEREFOR
Filed May 28, 1962 3 Sheets-Sheet 3
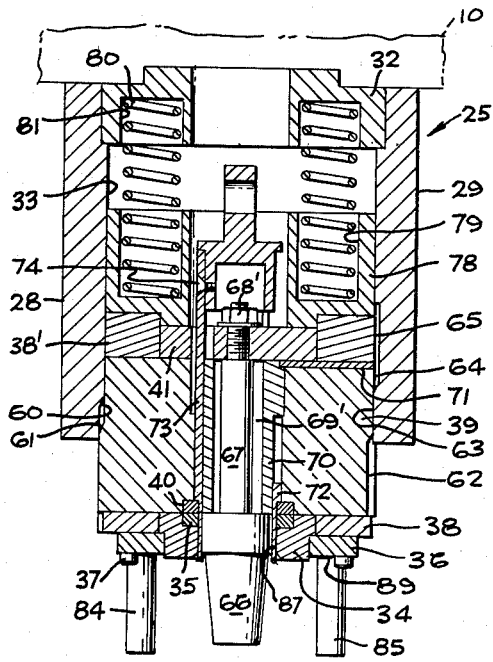
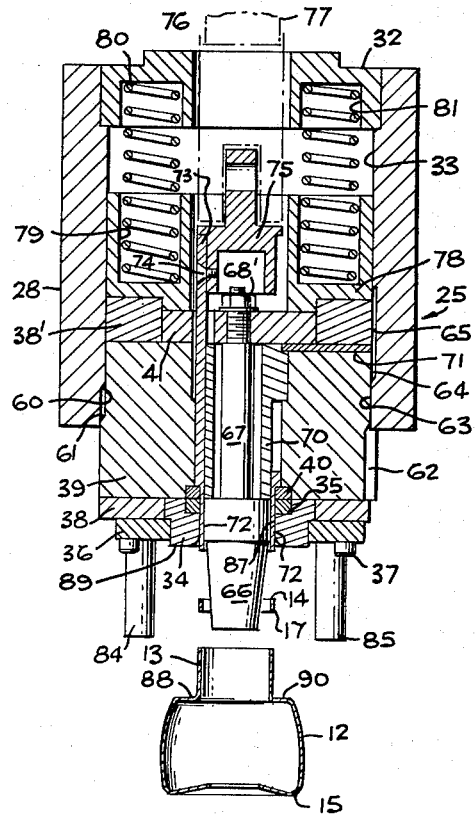
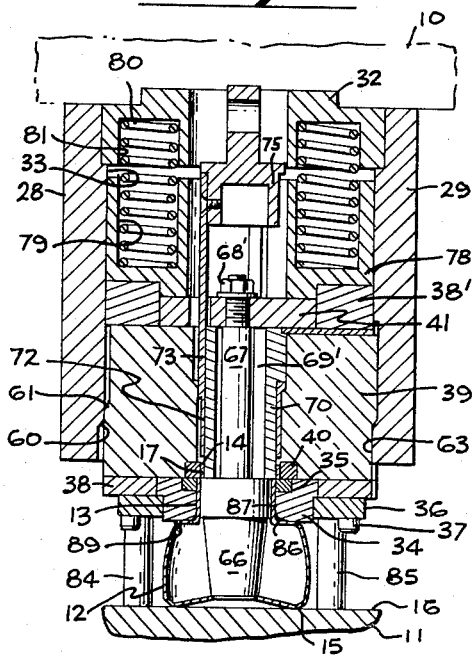
FRED J. RUSSELL
JOSEPH D. WITT
INVENTORS
BY
Beehler & Shanahan
ATTORNEYS

United States Patent Office 3,175,439
Patented Mar. 30, 1965

3,175,439
FLANGE TRIMMING METHOD AND APPARATUS THEREFOR
Fred J. Russell, 3800 Don Felipe Drive, Los Angeles, Calif., and Joseph D. Witt, Whittier, Calif.; said Witt assignor to said Russell
Filed May 28, 1962, Ser. No. 198,230
13 Claims. (Cl. 83—52)

The invention relates to the art of trimmimng sheet metal objects and particularly tubular or other hollow cylindrical objects, whether circular in cross-section or of other cross-sectional shape. The method and apparatus, however, in a broad sense is one which can be adapted to other types of trimming and shearing operations.

More particularly, the invention relates to a trimming method and apparatus which can be set up singly or in gangs, making use of a conventional press for trimming off small metal objects at a very rapid rate to neat, finished size.

Whenever sheet metal objects are drawn or otherwise formed by working the metal, there invariably is produced an irregular edge at the end which must be trimmed off neatly and cleanly before the object is ready for final processing. Various types of cut-off devices have been employed but despite the ability to eventually trim the object to proper size, all of the expedients heretofore made ues of have had one or more limitations and drawbacks. These have been especially noticeable in devices which have been devised for trimming the ends of hollow, cylindrical sections which are circular in cross-section. In some instances this has resulted in producing sections slightly out of round, necessitating reforming them before succeeding steps are undertaken. In other instances burrs are produced in the operation which entails subsequent removal. On still other occasions the operation is more time-consuming than the competitive nature of the object produced can permit. Various and sundry other limitations peculiar to special types of apparatus have been prevalent.

It is therefore among the objects of the invention to provide a new and improved method for trimming obpects and especially cylindrical objects which is neat, clean and rapid and which can be completely performed by a single, continuous movement of machinery.

Another object of the invention is to provide a new and improved method for trimming objects of hollow or tubular shape, and an apparatus therefor, wherein during longitudinal movement of actuating means a transverse shearing action takes place in one or more transverse directions thereby to make a complete clean-cut across the object to trim one portion of the material from the remainder.

Another object of the invention is to provide a new and improved apparatus for the trimming of objects which are substantially cylindrical in form, which is so constructed that during one continuous longitudinal movement of the apparatus shearing takes place in two separate transverse directions, thereby to make a clean, complete cut across the object.

Still another object of the invention is to provide a new and improved method and apparatus for the trimming of tubular sections which can be accomplished rapidly during a single, continuous, longitudinal movement of the main portions of a suitable apparatus and which at the same time will avoid any and all deformation of the object itself from which the trimmed portion is removed.

Still another object of the invention is to provide a new and improved apparatus for the trimming of tubular sections, the parts of which are rugged and positive-acting, thereby to assure continued performance over long periods of time and to require a relatively minimum amount of servicing.

Still further among the objects of the invention is to provide a new and improved method and apparatus therefor adapted to the trimming of cylindrical sections which can make use of a conventional press of virtually any size for either singular or multiple operation in that the entire trimming cycle is completed during one short movement of the apparatus in a vertical direction followed by a short reversal of direction in order to separate the trimmed part from the operation, whereupon the operation is immediately ready for a succeeding trimming step.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a longitudinal sectional view of an apparatus by means of which the method can be formed shown mounted as it would be in a press with the parts in positions occupied immediately prior to the first step of the operation.

FIGURE 2 is a cross-sectional view taken on the line 2—2 of FIGURE 1.

FIGURE 3 is a fragmentary longitudinal sectional view similar to FIGURE 1 but showing the apparatus moved into engagement with the work but before performance of the first operation.

FIGURE 4 is a longitudinal sectional view similar to FIGURES 1 and 3 but showing the apparatus as the parts would be subsequent to performance of the first step.

FIGURE 5 is a fragmentary sectional view similar to FIGURE 4 but showing the apparatus advanced vertically downwardly one step further for accomplishing the second step.

FIGURE 6 is a longitudinal sectional view at right angles to the view of FIGURE 1 showing the parts of the apparatus in the same relative positions as FIGURE 1.

FIGURE 7 is a longitudinal sectional view similar to FIGURE 6 showing the parts in the positions occupied at the same stage in the cycle as shown in FIGURE 5.

FIGURE 8 is a longitudinal sectional view on the same axis as FIGURE 1 showing the last step in the operation with the work being knocked out of the apparatus.

FIGURE 9 is a longitudinal sectional view on the same axis as FIGURE 6 showing the position of the parts during knock-out.

FIGURE 10 is a fragmentary diagrammatic cross-sectional representation of the two successive transverse shearing operations upon the work.

The essence of the method and apparatus for the performance of the method is to make use of a press type piece of machinery, and to transform part of the stroke into a movement transverse to the direction of the stroke to create a shearing action. Where the cross sectional dimension and wall thickness of the work warrants, the transverse movement may be confined to one direction. Under some circumstances, a composit movement may be prereable and this can be rotary misalignment of shear rings through a distance sufficient to do the shearing or by other misalignment motion of shear rings in a horizontal direction. For purposes of explanation, the apparatus herein disclosed makes use of two misalignment motions at right angles to each other in a horizontal plane.

In the embodiment of the invention chosen for the purpose of illustration, there is shown an apparatus adapted to be attached to a plate 10 of a conventional vertically operating press (not shown), there being shown a work table 11 upon which rests a workpiece 12, here taking the form of a sheet metal knob having a hollow tubular or cylindrical section 13 forming the shank of the knob at the upper end of which is an unfinished edge 14 which is to be trimmed off. A rim 15 of the knob rests upon an upper surface 16 of the work table. The operation of the method and apparatus is directed to trimming off a portion 17 of the section 13 along a broken line 18.

The ultimate effect of performance of the method and apparatus is best understood by reference to FIGURE 10 wherein the arrows in right angle relationship to each other show how the portion 17 is sheared partially in one direction as indicated by the arrow 19, after which the trimming is completed by shear action in the direction of the arrow 20. The broken line 17' shows the position of the portion 17 at the completion of the first operational step in the cycle accomplished when the apparatus is in the position shown in FIGURE 4. The portion in the position shown by the reference character 17" is the position the portion will have upon completion of the second step as illustrated when the parts of the apparatus are in the positions shown in FIGURES 5 and 7. These two steps are accomplished during a single, continuous, vertical motion of the apparatus downwardly into engagement with the work table and the work.

The apparatus is embodied primarily in a casing indicated generally by the reference character 25, the casing in the embodiment shown being substantially rectangular in cross-section and consisting essentially of a pair of cam cage members 26 and 27, for convenience designated as *upper* cam cage members, and a second pair of cam cage members 28 and 29, for convenience designated as *lower* cam cage members. Brackets 30 extending outwardly from the upper cam cage members provide means by which the casing is attached to the plate 10 by means of screws 31.

A cover 32 anchored by conventional means to the cam cage members encloses a chamber 33 in which operating parts of the apparatus are contained.

Inasmuch as the casing is anchored to the plate 10, all of the movement of parts in a transverse direction necessary to accomplish the trimming operation will take place within the casing and within the chamber 33.

The assembly of moving parts within the casing includes a lower cam and ring holder 34 which serves the double purpose indicated, namely, holding a lower exterior cutting ring 35 and acting as a cam when the ring is to be actuated. Retainer plates 36, disclosed to better advantage in FIGURE 6, are secured by screws 37 to an upper cam guide housing 38, thereby to secure the lower cam and ring holder in the assembly. An upper cam and ring holder 39, differnt views of which are shown respectively in FIGURES 1 and 6, serves to mount an upper exterior cutting ring 40 which is operated when the upper cam is subjected to a camming action. As noted in FIGURE 2, the upper cam and ring holder 39 is contained and retained between opposite side portions of what has been identified as the upper cam guide housing 38.

A scrap ejector guide 41 is positioned above the cam guide housing 38 and the upper cam and ring holder 39, as viewed in FIGURE 1 and again in FIGURE 6 and related figures. In FIGURE 6 the scrap ejector guide is also shown retained laterally by upper side portions 38' of the cam guide housing 38.

At the lower end of the cam cage member 26 is a cam face 45 which is adapted to engage a complementary cam face 46 on the corresponding side of the lower cam and ring holder 34. A similar cam face 47 higher up on the cam cage member 26 is adapted to engage a complementary cam face 48 on the corresponding end of the scrap ejector guide 41 as shown in FIGURE 1. On the opposite or right-hand end of the lower cam and ring holder 34 is a relief 49 adapted to receive a projection 50 on the cam cage member 27 when a projection 51 is received in a relief 52. Similarly, a relief 53 at the right-hand end of the scrap ejector guide is adapted to receive a portion 54 of the scrap ejector guide when a projection 55 of the scrap ejector guide extends into a relief 56. The reliefs and projections last described come into operation when a camming cycle takes place.

By reference to FIGURES 1 and 2 together it will be understood that the cam faces just described lie on one side only and act in one horizontal direction only, there being provision for an entirely different and separate set of cams for operation in a horizontal direction transverse to the first direction and at precisely right angles thereto the chosen embodiment.

By reference now to FIGURE 6 taken in conjunction with FIGURE 2, for example, it will be noted that at the lower end of the cam cage member 28 there is a cam face 60 which is adapted to engage a complementary cam face 61 on the left side of the upper cam and ring holder 39, as viewed in FIGURE 6. On the right side of the holder is a relief 62 adapted to receive a projection 63 when an opposite projection 64 is recieved within a relief 65 of the cam cage member 29.

A pilot 66 which projects downwardly has a shaft 67 extending upwardly through the scrap ejector guide 41 to which it is fastened by a nut 68' in the manner shown advantageously in FIGURES 6, 7 and 9. A collar 68 comprising a lower interior cutting post is located concentrically within and circumferentially spaced from the lower exterior cutting ring 35. Immediately above the collar 68 is an upper interior cutting post 70 which lies concentrically within and circumferentially spaced inwardly from the inside surface of the upper cutting ring 40, as shown advantageously in FIGURES 1 and 6. The upper interior cutting post 70 extends upwardly into engagement with the underside of the scrap ejector guide 41, as shown in FIGURE 6. A key 71 assists in holding the post in proper position. A series of three holes 69 in the scrap ejector guide accommodate a corresponding number of extensions 73 with an ample amount of clearance.

The balance of the structures in physical cooperation with the pilot and cutting posts includes a sleeve 72 which serves as a scrap ejector. Extending upwardly from the sleeve are the three extensions 73 secured by screws 74 to an upper collar 75. Attached to the collar by conventional means, not shown, is a clevis 76 which extends upwardly so as to be in a position of engagement with a stop 77 at the appropriate phase of the cycle. The stop 77 is a standard component in conventional punch press equipment and not shown in detail. A lower spring retainer 78 overlies the scrap ejector guide and also portions 38 of the upper cam guide housing, as shown in FIGURE 6. The spring retainer includes recesses 79 in which are springs 80, the springs being contained and retained at their upper ends in recess 81 of the cover 32 which serves as an upper spring retainer. These springs are for the purpose of returning parts to initial position after the apparatus passes through the trimming cycle.

In operation let it be assumed that the operating parts of the apparatus are in the positions illustrated in FIGURES 1 and 6 and that the plate 10 is elevated above the work table 11, as shown especially in FIGURE 1. The workpiece 12 is positioned upon the work table in approximate alignment with the pilot 66 sufficient so that the taper of the pilot will readily find its way into the interior of the section 13 of the workpiece. The press is then tripped by appropriate conventional means which causes the plate 10 and the attached apparatus to move downwardly from the position of FIGURE 1 to the position of FIGURE 3. At this point stops 82, 83, 84, 85 here shown as post-like projections are forced into contact with the upper surface 16 of the work plate. Although this stops downward travel of the interior portions of the apparatus, downward travel of the plate 10, and the cam cage members continues. Before the continuation of movement takes place, however, an annular radius 86 at the lower end of a hole 87 in the lower cam and ring holder finds its way into a corner 88 of the workpiece as a lower face 89 of the lower cam and ring holder comes into contact with an annular section 90 of the workpiece, as shown in FIGURE 3. The apparatus is now ready to make the first shearing operation needed to ultimately separate the portion 17 from the workpiece.

As the plate 10 and attached portions of the casing continue to move downwardly from the position of FIGURE 3 to a position of FIGURE 4, the cam faces 45 and 46 are forced into engagement. This action shifts the lower cam and ring holder 34 in a direction from left to right, as viewed in FIGURE 4, carrying with it the lower exterior cutting ring 35. Since all of these parts move slightly in the direction shown, the workpiece 12 will be shifted similarly in a direction from left to right a distance determined by engagement of the cam faces 45 and 46. During this movement the upper cam guide housing 38 remains in a position fixed transversely by the cam cage members 26 and 27 and accordingly the upper cam and ring holder 39 holds its position as does also the upper exterior cutting ring 40. Shearing accordingly takes place by reason of movement of the lower exterior cutting ring 35, the lower cutting ring being backed up as shown by the lower interior cutting post 68 while the upper cutting ring is backed up by the stationary positioning of the upper interior cutting post 70. This operation, however, produces only a partial trimming effect in that it moves the portion 17 being trimmed off the section 13 only to the position indicated by the reference character 17' in FIGURE 10.

Movement of the casing, however, is continuous in a downward direction while the foregoing shearing action is taking place. This movement is made possible by the presence of the reliefs 52 and 56 which are relatively long and permit travel of the casing downwardly to the degree indicated by the length of the reliefs. The degree of travel is shown in FIGURE 5 by reference to the vertical length of the space indicated by the reference character 91.

While this is happening a second shearing action in a ninety-degree direction is taking place by means of which the position of the portion 17 is moved to the location indicated by the reference character 17" in FIGURE 10.

Action to accomplish the second shearing effect can be followed in FIGURES 6 and 7. However, before the second shearing action takes place, the cam cage members 28 and 29 must be permitted movement while the first shearing action is taking place without themselves at that time performing any camming operation. It will be noted that there is considerable distance between the cam face 60 and its complementary cam face 61 in a vertical direction, as viewed in FIGURE 6 and hence that much travel will be possible after the stops strike the work table which is the period during which the first shearing action takes place.

As the plate and the casing continue downwardly past the position of FIGURE 4 to the position of FIGURE 5, the camming illustrated in FIGURE 7 will take place. As there shown the cam face 60 is forced into engagement with the complementary cam face 61 which causes the upper cam and ring holder 39 to shift in a direction from left to right, as viewed in FIGURE 7. Movement as described simultaneously shifts the upper exterior cutting ring 40 from left to right while the lower cam and ring holder 34 remains fixed in position transversely, thereby holding the workpiece 12 and its section 13 likewise fixed in position in a transverse direction. The shearing action accordingly will in this stage of the operation shift only the portion 17 to the position 17", as illustrated in FIGURE 10, which will completely and cleanly sever the portion entirely from the workpiece.

After the trimming operation has been completed in the manner described, the plate 10 will then be raised by press action. The springs 80, which in the meantime have been compressed during downward movement of the plate, then expand and force the lower spring retainer downwardly to the positions shown in FIGURES 8 and 9. These positions are the same with respect to elevation but the sections are at right angles to each other to show the relative position of the different interior working parts. Thus, the springs 80 force the cam and ring holders and the scrap ejector guide downwardly relative to the cam cage members, causing disengagement of all of the cams and return of these parts to initial positions such as those shown in FIGURES 1 and 6.

During further upward movement of plate 10 the clevis 76 strikes against the stop 77 just prior to plate 10 reaching its uppermost position, and therefore the scrap ejector embodied in part in the sleeve 72 remains fixed vertically against further movement. Consequently as the casing continues to move upwardly, the sleeve 72 projects through the hole 87 and is forced endwise against the edge 14 of the portion 17 which in turn is forced against the section 13 of the workpiece 12.

As the apparatus and pilot is pulled loose into the positions illustrated in FIGURES 8 and 9 the workpiece and its trimmed off section are pushed downwardly from the pilot until they are free of the pilot. The workpiece and the trimmed off section are thereafter removed by appropriate conventional means from the work table.

By following the foregoing description, it will be clear that the plate and the casing with all of its apparatus moves during one stage of the cycle continuously in a vertical direction which, in the example chosen, is a downward direction. Conceivably, of course, the direction could be reversed by a reversal of all of the parts. During this downward motion both shearing actions take place, one immediately following the other and require lateral movement to a very limited degree, namely, a distance no more than slightly greater than the thickness of the sheet metal comprising the workpiece. During this action the workpiece is held in position with respect to the lower cam and ring holder by the positioning action of the pilot 66 and the lower interior cutting post 68.

Upon completion of the downward stroke which finishes the trimming action, the apparatus then moves in one continuous upward stroke to return the mechanism to original position and then to eject the work and the trimmed portion, after which it is made immediately available for the next downward stroke to accomplish the next trimming operation. The movement therefore can be very fast. Moreover, because the apparatus is one capable of being set up in a gang operation, it can be made part of a high production operation. Movement of the parts is necessary through only a limited direction vertically which results in conservation of operational time. Additionally, the parts are simple and positive in their action likewise through such a limited distance that wear and maintenance is accordingly minimized.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A trimmer for a workpiece comprising a casing, said casing being mounted for movement longitudinally relative to said workpiece, a trim mechanism, said trim mechanism including a first trim means and a second trim means both mounted on said casing, both said trim means having transversely and longitudinally movable mountings relative to said casing, said trim means having a shape for engagement with the exterior of the workpiece, a cam means in said casing having a transverse driving engagement with one of said trim means to move said last identified trim means in a transverse direction in relation to said other trim means during longitudinal movement of said casing in relation to said trim mechanism.

2. A trimmer for a workpiece comprising a casing, said casing being mounted for movement longitudinally relative to said workpiece, a trim mechanism, said trim mechanism including an upper trim means comprising an upper trim ring and upper post and a lower trim means comprising a lower trim ring and lower post, said upper and lower trim means both being mounted on said casing, both said trim means having transversely and longitudinally movable mountings relative to said casing, said trim means being shaped for engagement with relatively opposite sides of the workpiece, a cam means in said casing having a horizontal driving engagement with one of said trim means to move said last identified trim means in a horizontal direction in relation to said other trim means during vertical movement of said casing in relation to said trim mechanism.

3. A trimmer for a workpiece comprising a casing, said casing being mounted for longitudinal movement relative to the workpiece, and a trim mechanism mounted on said casing, said casing comprising a plurality of pairs of cams, a cutting ring assembly comprising a shear cutter movably mounted in said casing for movement longitudinally relative to said casing and also for movement first in one horizontal direction and then for movement in a horizontal direction transverse to said first horizontal direction, said shear cutter having a shape for engagement with the exterior of the workpiece, a horizontally actuating camming engagement between said one of said pairs of cams and said shear cutter and a horizontally actuating camming engagement between another pair of cams and the shear cutter whereby a portion of said workpiece is trimmed from the remainder thereof in a shearing movement during a vertical movement of said casing.

4. A trimmer for a workpiece comprising a casing, said casing being mounted for movement longitudinally relative to said workpiece, and a trim mechanism mounted in said casing, said casing comprising a pair of upper cams and a pair of lower cams on alternate sides of said casing, a cutting ring assembly comprising a shear cutter mounted on said casing for movement longitudinally relative thereto and also mounted in said casing for movement first in one horizontal direction and then for movement in a horizontal direction transverse to said first horizontal direction, said shear cutter having a shape for engagement with the exterior of the workpiece, a horizontally actuating camming engagement between said pair of upper cams and said shear cutter at an upper elevation of said casing and a horizontally actuating camming engagement between said pair of lower cams and the shear cutter at a lower elevation whereby a portion of said workpiece is trimmed from the remainder thereof in two successive shearing movements in directions transverse to each other during vertical movement of said casing.

5. A trimming shear press for a workpiece comprising a work table for said workpiece, a plate mounted for reciprocation relative to said work table, a casing mounted on said plate for movement longitudinally relative to said workpiece, and a trim mechanism in said casing, said casing comprising a pair of upper cam cage members and a pair of lower cam cage members on alternate sides of said casing, a cutting ring assembly comprising a shear cutter and a cutting post mounted in said casing for movement longitudinally relative to said casing, said shear cutter having a movable relationship with said casing for movement first in one horizontal direction and then for movement in a horizontal direction transverse to said first horizontal direction, said shear cutter and cutting post having shapes respectively for engagement with the exterior and interior of the workpiece, a horizontally actuating camming engagement between said pair of upper cam cage members and said shear cutter at an upper elevation of said casing and a horizontally actuating camming engagement between said pair of lower cam cage members and the shear cutter at a lower elevation whereby a portion of said workpiece is trimmed from the remainder thereof in two successive shearing movements in directions transverse to each other during vertical movement of said casing.

6. A trimmer for a workpiece comprising a casing, said casing being mounted for movement longitudinally relative to said workpiece, and a trim mechanism mounted in said casing, said casing comprising a pair of upper cam cage members and a pair of lower cam cage members, a cutting ring assembly comprising exterior and interior relatively movable shear cutters mounted in said casing for movement longitudinally relative to the casing and for movement first in one horizontal direction and then for movement in a horizontal direction transverse to said first horizontal direction, said shear cutters having a shape adapted to engage the exterior of said workpiece, and a longitudinally movable knock-out member connected to said casing and concentrically mounted within said exterior shear cutters, a horizontally actuating camming engagement between said pair of upper cam cage members and said movable shear cutter at one elevation of said casing and a horizontally actuating camming engagement between said pair of lower cam cage members and the shear cutter at another elevation, whereby a portion of said section is trimmed from the remainder thereof in two successive shearing movements in directions transverse to each other during vertical movement of said casing, and means connected to said casing adapted to move said knock-out member relative to said shear cutters whereby said trimmed portion and said remainder of the workpiece are pushed away from said casing.

7. A trimmer for a hollow section comprising a work support for a workpiece, a plate mounted for reciprocation relative to said work support, a casing mounted on said plate for movement longitudinally relative to the workpiece, and a trim mechanism mounted in said casing, said casing comprising a pair of upper cam cage members and a pair of lower cam cage members, a cam guide housing in said casing, a lower cutting ring holder between said lower cam cage members and a lower cutting ring on said holder, an upper cutting ring holder within said cam guide and said upper cam cage members and an upper cutting ring on said last holder positioned in contiguous relation with said lower cutting ring, said cutting rings having each a shape adapted to engage the exterior of the workpiece, a cutting post assembly mounted at a central location within said casing and comprising a lower cutting post mounted within said lower cutting ring, an upper cutting post mounted within said upper cutting ring, said lower and upper cutting posts being adapted to engage the interior of said workpiece and to engage the interior of said hollow section, and stop means on said lower cutting ring holder adapted to engage said work support whereby to arrest longitudinal movement of said trim mechanism, a first set of horizontally acting cams between said lower cam cage members and said lower cutting ring holder adapted to shift said lower cutting ring and the lower cutting post in one horizontal direction, and a second set of horizontally acting cams between said upper cam cage and said upper cutting ring holder adapted to move said upper cutting ring and said upper interior cutting post in a horizontal direction transverse to said first horizontal direction whereby to sever a portion of said workpiece from the remainder during movement of the casing in relation to said support.

8. A trimmer for a hollow section comprising a stationary work support for a workpiece, a plate mounted for reciprocation relative to said work support, a casing mounted on said plate for movement longitudinally relative to the workpiece, and a trim mechanism mounted in said casing, said casing comprising a pair of plates forming upper cam cage members and a pair of plates forming lower cam cage members, a cam guide housing in said casing, a lower cutting ring holder between said lower cam cage members and a lower cutting ring on said holder, an upper cutting ring holder within said cam guide and said upper cam cage members and an upper cutting ring on said last holder in shearing relation with said lower cutting ring, said cutting rings having shapes adapted to engage the exterior of the workpiece, a cutting post assembly mounted at a central location within said casing and comprising a lower interior cutting post mounted within said lower cutting ring, an upper interior cutting post mounted within said upper cutting ring, and a pilot extending below said posts and adapted to engage said hollow section of the workpiece, said post having shapes adapted to engage the interior of the workpiece, and stop means on said lower cutting ring holder adapted to engage said work support whereby to arrest longitudinal movement of said trim mechanism, a first set of horizontally acting cams between said lower cam cage members and said lower cutting ring holder adapted to shift said lower cutting ring and said lower interior cutting post in one horizontal direction, a second set of horizontally acting cams between said upper cam cage and said upper cutting ring holder adapted to shift said upper cutting ring and said upper interior cutting post in a horizontal direction transverse to said first horizontal direction whereby to sever said portion of said workpiece from the remainder during movement of the casing in relation to said work support, a scrap ejector surrounding said upper interior cutting post and movable vertically relative to said cutting rings, and means acting between said cam cage members and said cam holders adapted to return said cutting rings and said holders therefor to initial positions.

9. A method of trimming an end from a workpiece by employment of a set of horizontally mutually moving sear rings having a shape adapted to engage the exterior of the workpiece and mounted in a movable casing comprising securing said workpiece at a location removed from the shear rings and in a position against movement away from said casing, moving said casing longitudinally into engagement with said workpiece, stopping said movement of a portion of said casing and shear rings and continuing movement of another portion of said casing, moving at least one of said shear rings parallel to the other in a diverse direction relative to the other and in a direction transverse to movement of the casing whereby to partially trim off a portion of said workpiece from the remainder.

10. A method of trimming an end from a workpiece by employment of a set of horizontally mutually moving shear rings having a shape adapted to engage the exterior of the workpiece and mounted in a movable casing comprising securing said workpiece at a location removed from the shear rings and in position against movement away from said casing, moving said casing into engagement with said workpiece, stopping said movement of a portion of said casing and said shear rings and continuing movement of another portion of said casing, moving at least one of said shear rings parallel to the other in one direction transverse to movement of the casing whereby to partially trim off a portion of said workpiece from the remainder, continuing said movement of said casing and moving at least one of said shear rings in a second direction parallel to the other whereby to complete the trimming of said portion.

11. A method of trimming an end from a workpiece by employment of a set of horizontally mutually moving shear rings having a shape adapted to engage the exterior of the workpiece and mounted in a vertically movable casing comprising securing said workpiece at a location removed from the casing and in position against movement away from said casing, moving said casing vertically into endwise engagement with said workpiece, continuing vertical movement of one portion of said casing while stopping vertical movement of another portion of said casing and moving at least one of said shear rings in a direction parallel to the other in one horizontal direction by action of said one portion of the casing whereby to partially cut a portion of said workpiece from the remainder in one horizontal direction, continuing said movement vertically and moving at least one of said shear rings in a second horizontal direction by action of said one portion of the casing whereby to complete removal of said portion of the workpiece from the remainder.

12. A method of trimming an end from a workpiece by employment of a set of horizontally acting shear rings having a shape adapted to engage the exterior of the workpiece and mounted in a vertically movable casing comprising securing said workpiece at a location removed from the casing and in a position against movement endwise away from said casing, moving said casing vertically into endwise engagement with said workpiece, continuing vertical movement of one portion of said casing while stopping vertical movement of another portion of said casing and moving said shear rings relative to each other in one horizontal direction whereby to create a shear cut on said workpiece in one horizontal direction to partially trim said end from said workpiece, continuing movement of said one portion of the casing vertically while said other portion of the casing remains stopped, and moving said shear rings in a second horizontal direction transverse to the first horizontal direction by action of said one portion of the casing whereby to complete the trimming of said end and finally separating said workpiece and said trimmed end from the rings.

13. A trimmer for a workpiece comprising a casing, said casing being mounted for movement longitudinally relative to said workpiece, a trim mechanism including a first trim means and a second trim means both mounted on said casing and having a shape for engagement with the exterior of the workpiece to be trimmed, both said trim means being movable transversely and longitudinally relative to said casing, and a cutting post mounted within at least one of the trim means and adapted for engagement with the interior of the workpiece to be trimmed, cam means in said casing having a transverse driving engagement with one of said trim means to move said last identified trim means in a transverse direction in relation to said other trim means during longitudinal movement of said casing in relation to said mechanism.

References Cited by the Examiner
UNITED STATES PATENTS

| 1,396,230 | 11/21 | Peterson | 83—182 |
| 2,347,808 | 5/44 | Brehm | 83—54 |
| 2,746,544 | 5/56 | Brehm | 83—182 |
| 2,760,574 | 8/56 | Taylor | 83—140 |

ANDREW R. JUHASZ, *Primary Examiner.*

WILLIAM W. DYER, JR., *Examiner.*